US012775287B2

(12) United States Patent
Peng et al.

(10) Patent No.: US 12,775,287 B2
(45) Date of Patent: Oct. 27, 2026

(54) CONTROL METHOD FOR DRONE-ASSISTED MAINTENANCE, ELECTRONIC DEVICE AND STORAGE MEDIUM

(71) Applicants: ZHEJIANG HENGYI PETROCHEMICAL CO., LTD., Zhejiang (CN); Hangzhou Yitong New Material Co., Ltd., Zhejiang Province (CN)

(72) Inventors: Xiantao Peng, Zhejiang (CN); Peng Wang, Zhejiang (CN); Yibo Qiu, Zhejiang (CN); Junliang Jin, Zhejiang (CN); Xuan Wu, Zhejiang (CN); Jiabo Gao, Zhejiang (CN)

(73) Assignees: ZHEJIANG HENGYI PETROCHEMICAL CO., LTD., Zhejiang (CN); Hangzhou Yitong New Material Co., Ltd., Zhejiang Province (CN)

( * ) Notice: Subject to any disclaimer, the term of this patent is extended or adjusted under 35 U.S.C. 154(b) by 4 days.

(21) Appl. No.: 18/888,815

(22) Filed: Sep. 18, 2024

(65) Prior Publication Data

US 2025/0181082 A1 Jun. 5, 2025

(30) Foreign Application Priority Data

Dec. 1, 2023 (CN) ......................... 202311639063.7

(51) Int. Cl.
*G05D 1/667* (2024.01)
*G05D 1/644* (2024.01)
(Continued)

(52) U.S. Cl.
CPC ............. *G05D 1/667* (2024.01); *G05D 1/644* (2024.01); *G05D 1/646* (2024.01); *G05D 1/69* (2024.01);
(Continued)

(58) Field of Classification Search
CPC ........ G05D 1/667; G05D 1/644; G05D 1/646; G05D 1/69; G05D 2105/20;
(Continued)

(56) References Cited

U.S. PATENT DOCUMENTS 11,565,807 B1 * 1/2023 Zuckerman ............ B64U 10/13
2021/0304343 A1 9/2021 Spjuth et al.
(Continued)

FOREIGN PATENT DOCUMENTS

CN 108960695 * 12/2018 ............. G06Q 50/14
CN 112009719 A 12/2020
(Continued)

OTHER PUBLICATIONS

CN_108960695 English translation with Paragraph numbers (Year: 2018).*
(Continued)

*Primary Examiner* — Joan T Goodbody
(74) *Attorney, Agent, or Firm* — Faegre Drinker Biddle & Reath LLP

(57) ABSTRACT

Provided is a control method for drone-assisted maintenance, an electronic device and a storage medium. The method includes: determining a target workpiece and a storage location thereof in response to an assistance message obtained by a first terminal located at a construction location, wherein the assistance message is used to indicate the target workpiece absent in a maintenance operation; planning a flight path for a transport task according to the construction location and the storage location; and control-
(Continued)

ling a drone to transport the target workpiece to the construction location according to the flight path.

6 Claims, 2 Drawing Sheets

(51) Int. Cl.

| | |
|---|---|
| ***G05D 1/646*** | (2024.01) |
| ***G05D 1/69*** | (2024.01) |
| ***G06Q 10/047*** | (2023.01) |
| ***G06Q 10/0832*** | (2023.01) |
| *G05D 105/20* | (2024.01) |
| *G05D 107/70* | (2024.01) |
| *G05D 109/20* | (2024.01) |
| *G06Q 10/083* | (2023.01) |
| *G06Q 10/087* | (2023.01) |
| *G06Q 10/20* | (2023.01) |
| *G06Q 50/08* | (2012.01) |

(52) U.S. Cl.
CPC ....... *G06Q 10/047* (2013.01); *G06Q 10/0832* (2013.01); *G05D 2105/20* (2024.01); *G05D 2107/70* (2024.01); *G05D 2109/20* (2024.01); *G06Q 10/0838* (2013.01); *G06Q 10/087* (2013.01); *G06Q 10/20* (2013.01); *G06Q 50/08* (2013.01)

(58) Field of Classification Search
CPC ........... G05D 2107/70; G05D 2109/20; G06Q 10/047; G06Q 10/0832; G06Q 10/0838; G06Q 10/087; G06Q 10/20; G06Q 50/08
See application file for complete search history.

(56) References Cited

U.S. PATENT DOCUMENTS

| | | | | |
|---|---|---|---|---|
| 2022/0198944 | A1 | 6/2022 | Mclemore et al. | |
| 2022/0397917 | A1 * | 12/2022 | Arksey | G06T 7/73 |
| 2023/0049845 | A1 | 2/2023 | Tran et al. | |
| 2023/0252902 | A1 | 8/2023 | Bianchi et al. | |

FOREIGN PATENT DOCUMENTS

| | | | | |
|---|---|---|---|---|
| CN | 113110591 | A | 7/2021 | |
| CN | 113867407 | * | 12/2021 | G01D 21/02 |
| CN | 113867407 | A | 12/2021 | |
| CN | 215753012 | U | 2/2022 | |
| CN | 115373410 | A | 11/2022 | |
| CN | 115488864 | A | 12/2022 | |
| CN | 115686028 | A | 2/2023 | |
| CN | 116225071 | A | 6/2023 | |
| CN | 117013422 | A | 11/2023 | |
| CN | 117104458 | A | 11/2023 | |
| CN | 117111639 | A | 11/2023 | |
| JP | 2017532237 | A | 11/2017 | |
| JP | 2019179422 | A | 10/2019 | |
| JP | 2020091842 | A | 6/2020 | |
| JP | 2021096579 | A | 6/2021 | |
| JP | 2021533425 | A | 12/2021 | |
| JP | 2022505659 | A | 1/2022 | |
| JP | 2022186375 | A | 12/2022 | |
| JP | 2023530991 | A | 7/2023 | |
| WO | 2019098017 | A1 | 5/2019 | |
| WO | 2021255870 | A1 | 12/2021 | |
| WO | 2023100308 | A1 | 6/2023 | |

OTHER PUBLICATIONS

CN113867407 English translation with paragraph numbers (Year: 2021).*

Fartook, O., MacLean, K., Oron-Gilad, T. et al. Expanding the Interaction Repertoire of a Social Drone: Physically Expressive Possibilities of a Perched BiRDe. Int J of Soc Robotics 16, 257-280 (2024). (Year: 2024).*

Kim, Bomyeong ; Kim, Hyun Young ; Kim, Jinwoo, "Getting home safely with drone," Proceedings of the 2016 ACM International Joint Conference on Pervasive and Ubiquitous Computing: Adjunct, 2016, p. 117-120. (Year: 2016).*

The State Intellectual Property Office of People's Republic of China; Chinese Application No. 202311639063.7; First Office Action; 23 pages; dated Jan. 19, 2024.

The State Intellectual Property Office of People's Republic of China; Chinese Application No. 202311639063.7; Notification on Grant; 8 pages; dated Aug. 2, 2024.

European Patent Office; European Extended Search Report; EP Application No. 24200365.5; 9 pages; dated Mar. 10, 2025.

Japanese Patent Office; Notice of Reasons for Refusal; Japanese Application No. 2024-192925; 5 pages; dated Nov. 21, 2024.

Japanese Patent Office; Decision to Grant; Japanese Application No. 2024-192925; 3 pages; dated Jan. 20, 2025.

Tan, Rebecca; Delivery Drones: Revolutionizing Logistics; https://blog.aonic.com/my/blogs-drone-technology/delivery-drones-revolutionizing-logistics; 5 pages; Jun. 7, 2023.

Knight, Renee: Trends: Scaling Up for Drone Delivery; https://insideunmannedsystems.com/trends-scaling-up-for-drone-delivery; 12 pages; Aug. 30, 2023.

Choi, Hee-Wook et al.; An Overview of Drone Applications in the Construction Industry; Drones; vol. 7, No. 3; 21 pages; Aug. 3, 2023.

Japanese Patent Office; Notice of Reasons for Rejection; JP Application No. 2025-021247; 7 pages; dated Feb. 3, 2026.

Japanese Patent Office; Patent Grant; JP Application No. 2025-021247; 3 pages; dated Mar. 3, 2026.

* cited by examiner

CONTROL METHOD FOR DRONE-ASSISTED MAINTENANCE, ELECTRONIC DEVICE AND STORAGE MEDIUM

CROSS-REFERENCE TO RELATED APPLICATIONS

The present application claims priority to Chinese Patent Application No. CN202311639063.7, filed with the China National Intellectual Property Administration on Dec. 1, 2023, the disclosure of which is hereby incorporated herein by reference in its entirety.

TECHNICAL FIELD

The present disclosure relates to the field of drone technology, and in particular to the field of drone control, route planning and device maintenance technologies.

BACKGROUND

In traditional maintenance operations, when a maintenance person suddenly finds the lack of necessary tools or parts while performing a maintenance task, he usually needs to interrupt the current work process and return to the warehouse or other storage areas to obtain the required items, resulting in a significant decrease in maintenance efficiency. Especially in scenarios with narrow space, complex environment and difficult entry and exit, the maintenance progress and related production operations will be greatly affected.

SUMMARY

The present disclosure provides a control method and apparatus for drone-assisted maintenance, a device and a storage medium, to solve or alleviate one or more technical problems in the prior art.

In a first aspect, the present disclosure provides a control method for drone-assisted maintenance, including:

determining a target workpiece and a storage location thereof in response to an assistance message obtained by a first terminal located at a construction location, where the assistance message is used to indicate the target workpiece absent in a maintenance operation;

planning a flight path for a transport task according to the construction location and the storage location; and controlling a drone to transport the target workpiece to the construction location according to the flight path.

In a second aspect, the present disclosure provides an apparatus for drone-assisted maintenance, including:

a workpiece search module configured to determine a target workpiece and a storage location thereof in response to an assistance message obtained by a first terminal located at a construction location, where the assistance message is used to indicate the target workpiece absent in a maintenance operation;

a path planning module configured to plan a flight path for a transport task according to the construction location and the storage location; and a control module configured to control a drone to transport the target workpiece to the construction location according to the flight path.

In a third aspect, provided is an electronic device, including:

at least one processor; and a memory connected in communication with the at least one processor;

where the memory stores an instruction executable by the at least one processor, and the instruction, when executed by the at least one processor, enables the at least one processor to execute the method of any embodiment of the present disclosure.

In a fourth aspect, provided is a non-transitory computer-readable storage medium storing a computer instruction thereon, and the computer instruction is used to cause a computer to execute the method of any embodiment of the present disclosure.

In a fifth aspect, provided is a computer program product including a computer program, and the computer program implements the method of any embodiment of the present disclosure, when executed by a processor.

The beneficial effects of the technical solution provided in the present disclosure at least include:

When a necessary workpiece is absent during the maintenance operation, the workpiece can be transported timely and quickly by the drone, thereby assisting the maintenance operation and shortening the time of the maintenance operation.

It should be understood that the content described in this part is not intended to identify critical or essential features of embodiments of the present disclosure, nor is it used to limit the scope of the present disclosure. Other features of the present disclosure will be easily understood through the following description.

BRIEF DESCRIPTION OF THE DRAWINGS

In the accompanying drawings, the same reference numbers represent the same or similar parts or elements throughout the accompanying drawings, unless otherwise specified. These accompanying drawings are not necessarily drawn to scale. It should be understood that these accompanying drawings only depict some embodiments provided according to the present disclosure, and should not be considered as limiting the scope of the present disclosure.

DETAILED DESCRIPTION

The present disclosure will be described below in detail with reference to the accompanying drawings. The same reference numbers in the accompanying drawings represent elements with identical or similar functions. Although various aspects of the embodiments are shown in the accompanying drawings, the accompanying drawings are not necessarily drawn to scale unless specifically indicated.

In addition, in order to better illustrate the present disclosure, numerous specific details are given in the following specific implementations. Those having ordinary skill in the art should understand that the present disclosure may be performed without certain specific details. In some examples, methods, means, elements and circuits well known to those having ordinary skill in the art are not described in detail, in order to highlight the subject matter of the present disclosure.

Figure 1:
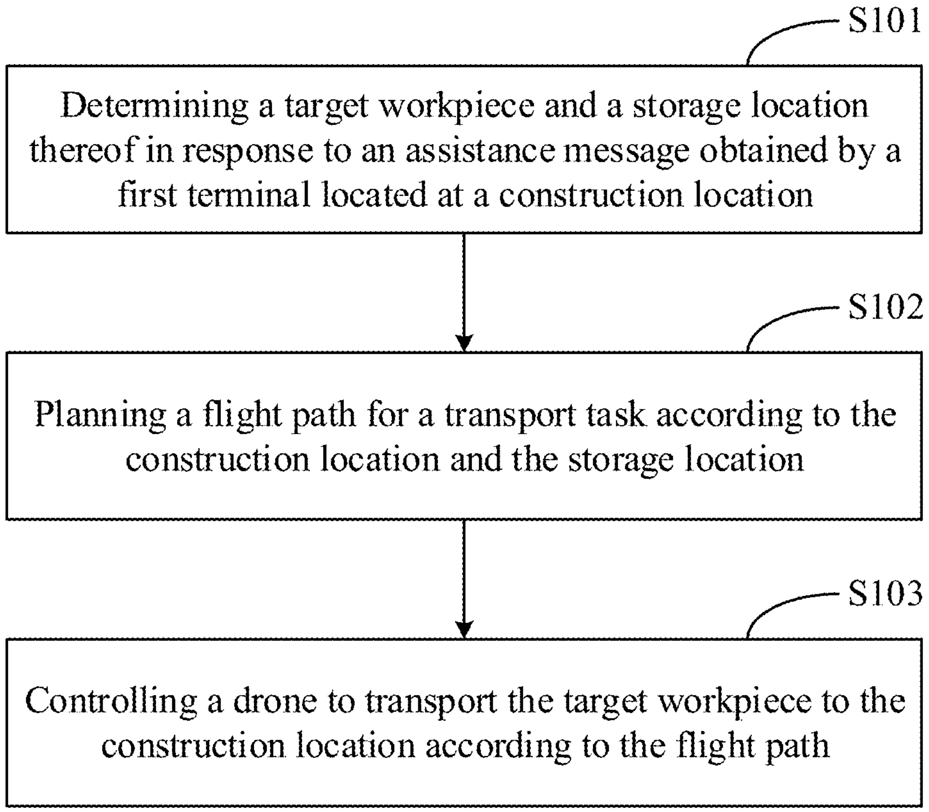
FIG. 1 is a schematic flow chart of a control method for drone-assisted maintenance according to an embodiment of the present disclosure.

FIG. 1 is a schematic flow chart of a control method for drone-assisted maintenance according to an embodiment of the present disclosure. As shown in FIG. 1, the method includes at least the following steps:

S101: determining a target workpiece and a storage location thereof in response to an assistance message obtained by a first terminal located at a construction location, where the assistance message is used to indicate the target workpiece absent in a maintenance operation.

The control method for drone-assisted maintenance in the embodiment of the present disclosure can be applied to a data processing device, thereby obtaining an execution system for running this method. For example, this device may implement the control method for drone-assisted maintenance when deployed in a first server or other processing device.

The first server may be an independent server, or may be a server cluster or a distributed system, or may be a cloud server that provides basic cloud computing services such as cloud service, cloud database, cloud computation, cloud function, cloud storage, network service, cloud communication, middleware service, as well as big data and artificial intelligence platform.

In an embodiment of the present disclosure, the first terminal is an electronic device carried by the maintenance personnel into the maintenance construction location, and the first terminal may communicate with the first server through a wireless network. Optionally, the first terminal is a terminal device such as a smart phone, a tablet computer, a laptop computer, a smart watch, a Personal Digital Assistant (PDA), etc.; or may be a device such as smart glasses, a companion drone, a video acquisition device, etc. for assisting and recording the maintenance process, but is not limited thereto. An application supporting the drone-assisted maintenance is installed and run in the first terminal.

The maintenance personnel may use the first terminal to generate an assistance message and send it to the execution system. The assistance message is used to indicate an item absent in the maintenance operation currently being performed, and the assistance is needed to obtain the item. The assistance message may include a voice message spoken by the maintenance personnel, and the system determines the absent workpiece information through voice recognition and semantic analysis. The assistance message may also be a text message manually input by the maintenance personnel, and the system determines the absent workpiece information through semantic analysis. Alternatively, the maintenance personnel may directly select the absent workpiece information by clicking or other operations on an interactive interface of a preset program running on the first terminal.

It should be noted that the space is very limited and it is inconvenient for the maintenance personnel to act in some complex construction environments, for example, inside crisscrossing pipes, reactors, agitators and other devices. The assistance message can be generated more conveniently in the form of voice.

After determining the absent workpiece, the system may query the storage location of the workpiece through the inventory information stored in itself, or may send the information of the target workpiece to a second server running the inventory management system; and the storage location of the target workpiece is queried through the second server.

S102: planning a flight path for a transport task according to the construction location and the storage location.

When sending the assistance message to the system, the first terminal may simultaneously send its own location, that is, the construction location, to the system as a part of the assistance message. The system plans the flight path using a preset map according to the construction location and storage location.

The path planning needs to consider factors such as terrain, obstacle, flight restriction, etc. between the storage location of the target workpiece and the construction location, and can be achieved through the elevation information of the map data, the building distribution, etc.

S103: controlling a drone to transport the target workpiece to the construction location according to the flight path.

The system generates a planned flight path and transmits it to the drone performing the transport task as a navigation instruction, thereby controlling the drone to fly along the planned flight path. The flight path should be designed to reach the storage location of the target workpiece efficiently while ensuring the flight safety and avoiding collisions and other potential hazards.

After the drone is loaded with the target workpiece, the flight control system can start executing the transport task according to the instruction, and control the drone to fly along the planned path. The drone may perceive the surrounding environment and its own state in real time during flight. Such perception can be achieved by installing a sensor (such as camera, laser radar, etc.). If new obstacles or other risks are discovered during flight, the flight control system can make an adjustment to the flight path based on existing relevant obstacle avoidance technologies, such as modifying the path or taking an obstacle avoidance measure.

When the drone arrives at the construction location, there may be a need to perform at least one of hovering, landing, throwing, lowering the suspension bin and other actions depending on the manner to load the target workpiece, the environment of the construction location, the size of the target workpiece and other conditions, to ensure that the maintenance personnel can safely pick up the target workpiece. Then the drone may take off again in the air, return to the drone parking location along the previously planned path, or perform other tasks depending on specific needs.

According to the solution of the embodiment of the present disclosure, when the maintenance operation cannot be continued due to the lack of a necessary workpiece, the workpiece can be transported in time by the drone, thereby assisting the maintenance operation and shortening the time of the maintenance operation. The downtime and maintenance of many important devices will cause the entire production process to stop, resulting in huge economic losses. The timely and rapid completion of maintenance can reduce the losses as much as possible.

In a possible implementation, S101 of determining the target workpiece and the storage location thereof in response to the assistance message obtained by the first terminal located at the construction location, further includes:

S1011: determining workpiece information of a tool or part absent in the maintenance operation according to semantic information contained in the assistance message in response to the assistance message obtained by the first terminal located at the construction location.

S1012: determining the target workpiece and the storage location thereof from inventory according to the workpiece information.

In an embodiment of the present disclosure, after receiving the assistance message sent by the first terminal located at the construction location, the system performs semantic analysis on the voice message or manually-input text message in the assistance message to identify the workpiece information of the tool or part absent in the maintenance operation. For example, the voice information is converted into text through the voice recognition technology, and then the key information is extracted using the Natural Language Processing (NLP) technology.

After obtaining the workpiece information, the system determines the target workpiece and its storage location in the inventory by querying a local workpiece information database or communicating with the second server running the inventory management system. Optionally, the workpiece information includes the number, name, specification and other information of the workpiece, to ensure that the target workpiece is found accurately.

According to the solution of the embodiment of the present disclosure, the entire process enables the system to understand the requirement of the maintenance personnel and accurately locate the required tool or part in the inventory through semantic analysis and information query, helping to improve the efficiency of the maintenance operation, and ensuring that the drone can obtain and transport the absent workpiece quickly.

In a possible implementation, S102 of planning the flight path for the transport task according to the construction location and the storage location further includes:

S1021: determining environmental information for flight of the drone according to the construction location.

In an embodiment of the present disclosure, the environmental information may be understood as information indicating the complexity of the environment. The complexity of the environment in an open area is generally lower than that in an indoor area. In the indoor area, the complexity of the environment in a passage area is generally lower than that in a workshop area with production equipment. The more complex the environment, the more difficult it is to fly the drone. The environmental information for flight of the drone may be understood as the difficulty information of flight of the drone. The geographical information of the factory where the construction location is located, the distribution locations of various buildings and devices, etc. are determined from the preset map according to the construction location. The spatial layout (including the heights of the buildings, the locations and heights of the devices, etc.) of the factory where the construction location is located is analyzed. Environmental rules may be preset for various buildings and devices, such as indicating which areas are open and can be used for flying and which areas are restricted from flying. Furthermore, the flight difficulty may be set for areas where various devices are located. For example, the flight difficulty in open areas and areas more than 3 meters above devices is level 1, the flight difficulty in areas where devices in type A are located is level 2, the flight difficulty in areas where devices in type B are located is level 3, the difficulty of flying between complex pipeline networks is level 4, and the flight difficulty inside pipelines and devices is level 5.

S1022: determining a task type according to the environmental information.

The flight difficulty of the current task can be judged based on the environmental information, and then the task type can be determined accordingly. Exemplarily, if the construction location is in an outdoor open area or an indoor area with empty space, the drone can fly in a straight line and the task type may be a simple type; if the construction location is in an area with densely distributed devices and various interleaved pipeline networks, the task type is a complex type and may involve complex operations such as obstacle avoidance. The task types may be divided according to whether the level of flight difficulty is greater than a preset threshold (e.g., level 4).

In the case of many drones with different loading methods, it is also possible to limit the drone type or loading method when determining the task type based on environmental information. For example, when the transport task is in a complex type and the condition for drones to land is not met, a drone with small volume and high flexibility can be preferentially selected, and the loading method such as throwing or hovering can be preferentially selected.

S1023: planning the flight path for the transport task according to the task type, the construction location and the storage location.

Appropriate flight strategies need to be selected for different task types. Then the flight path is planned in the preset map according to the construction location and storage location. For example, for areas with low flying difficulty, a flight strategy of high-speed direct flight may be adopted; and for areas with high flying difficulty, a flight strategy of low speed or increased flight altitude may be adopted.

According to the solution of the embodiment of the present disclosure, the optimal flight path can be dynamically planned according to the map information and environmental rules in different environments, ensuring that the drone can safely and efficiently transport the target workpiece in various scenarios.

In a possible implementation, S1023 of planning the flight path for the transport task according to the task type, the construction location and the storage location further includes:

- when the task type is not a complex type, planning a plurality of first paths connecting the construction location with the storage location by using an open area and/or a passage area in a preset map;
- evaluating time consumption and safety of the plurality of first paths; and
- selecting one from the plurality of first paths to obtain the flight path for the transport task according to an evaluation result and a timeliness requirement.

In an embodiment of the present disclosure, a plurality of paths connecting the construction location with the storage location are firstly determined by using the preset map information, which may be the open area or passage area. The open area includes an open area above various devices inside the factory, and the passage area includes pedestrian passages and device passages inside the factory.

Then the path time consumption is evaluated. For each connection path, the system estimates the flight time. The flight distance, flight speed, possible risk area and other factors may be involved in this process. For each connection path, the safety needs to be evaluated, including whether the flight area is restricted and whether there are possible obstacles such as mobile equipment, worker, etc. Factors such as time consumption and security can be comprehensively considered to generate a comprehensive score for each connection path, to obtain an evaluation result.

The timeliness requirement refers to the maximum allowable flight time for the transport task. The timeliness requirement may be indicated by the maintenance personnel in the assistance message, for example, the words such as "as soon as possible" or "hurry up" appear in the voice message. The path selection is carried out based on the evaluation result and timeliness requirement, and one of paths with reasonable flight time and high safety score is selected as the final flight path.

According to the solution of the embodiment of the present disclosure, when the task is not complicated, the system can select the most suitable flight path by taking into account factors such as time consumption and safety according to the map information and preset rule, to ensure that the drone completes the transport task of the target workpiece in a safe manner within the limited time.

In a possible implementation, S1023 of planning the flight path for the transport task according to the task type, the construction location and the storage location further includes:

- when the task type is a complex type, obtaining a historical path of the first terminal;
- planning and generating a second path according to the construction location and the storage location; and
- optimizing and adjusting the second path by using at least part of the historical path to obtain the flight path for the transport task.

In an embodiment of the present disclosure, for a complex task, i.e., an area with relatively complex environment, the preset map information usually does not include specific data of the area. Therefore, the planned flight path may only be a straight-line path from the entrance of the area to the construction location, and it is difficult to freely shuttle back and forth in the gaps between devices. The drone performing the transport task in this area may need to avoid obstacles multiple times in an attempt to reach the construction location. If the environment is too complex, the drone performing the transport task may take too long or may be difficult to reach the construction location. In this regard, the system may obtain the historical path of the maintenance personnel when carrying the first terminal into the construction location, and generate the flight path for the transport task with the assistance of the historical path. The historical path may be obtained through the records of the first terminal device or other location tracking technologies.

According to the construction location and storage location, the system plans and generates an initial second path, which may be a basic path planned according to the preset map, the open passage and other information.

The system optimizes and adjusts the initial second path by using at least part of the historical path, which may specifically include:

Trajectory matching: the historical path is matched with the second path to find close or similar parts.

Dynamic adjustment: the second path is dynamically adjusted according to the actual travel situation in the historical path, to adapt to the actual situation.

Obstacle avoidance: if there is an obstacle avoidance track in the historical path, this information is used to adjust the second path to avoid obstacles.

According to the solution of the embodiment of the present disclosure, the historical path information is used in combination with the planned second path to generate the final flight path through matching and adjustment, to better adapt to the complex construction environment and improve the navigation accuracy and efficiency of the drone.

In a possible implementation, the first terminal includes a companion drone, and the historical path of the first terminal includes a historical flight path of the companion drone.

In an embodiment of the present disclosure, the historical flight path formed by the companion drone in the process of following the maintenance personnel into the complex construction environment and arriving at the construction location may be used as a reference for the flight path of the drone that transports the target workpiece. The flight path for the transport task is planned in combination with the historical flight trajectory, so as to guide the drone performing the transport task to learn the travel trajectory of the companion drone in this space, better avoid the transport drone from entering other spurroads or collisions in this complex space, and further ensure the rapid delivery of the target workpiece.

It should be noted that the companion drone can use the existing related companion technology to follow the maintenance personnel, making it convenient for the maintenance personnel to perform operations such as process recording, remote call and device historical information query. During companion flight, the companion drone usually only needs to reach the walking speed of a person and has a relatively low flying speed, so it has enough time to avoid obstacles encountered during the flight. The historical flight path obtained hereby can facilitate the drone performing the transport task to reduce obstacle avoidance actions and thus reach the construction location at a faster speed, improving the efficiency of maintenance operation.

During maintenance operation, the companion drone needs to record its own flight trajectory to form the historical flight path. The flight trajectory of the companion drone may be sent to the system in real time or when the assistance message is sent.

In a possible implementation, the step of optimizing and adjusting the second path by using at least part of the historical path to obtain the flight path for the transport task specifically includes:

- determining a complex area according to the construction location;
- determining a first trajectory point entering the complex area from the second path;
- determining a second trajectory point closest to the first trajectory point from the historical path;
- merging a portion of the second path after the first trajectory point with a portion of the historical path after the second trajectory point to obtain a merged path; and
- splicing a portion of the second path before the first trajectory point with the merged path to obtain the flight path for the transport task.

In an embodiment of the present disclosure, the step of determining the complex area according to the construction location includes: determining the complex area to be flown over according to the construction location and environmental information, which may include a narrow passage, a high obstacle, etc.

Then, the first trajectory point entering the complex area, i.e., an entry point for flying over the complex area, is determined in the second path. Then, the second trajectory point closest to the first trajectory point is found from the historical path, that is, a trajectory point that can dock with the second trajectory point is found from the historical path.

The portion of the second path after the first trajectory point is merged with the portion of the historical path after the closest second trajectory point to form the merged path. The purpose of this step is to ensure the rationality and security of the merged path with the help of the experience information in the historical path.

The portion of the second path before the first trajectory point is spliced with the merged path to obtain the final flight path. This step ensures that the continuity of the original path is maintained while using the guided path to effectively navigate in the complex area.

In the planning process of the flight path, the historical path may be merged with the second path using any of the following merging methods:

I. Weighted merging: for two paths, weights may be assigned and then the merging operation is performed. The weight may be assigned based on factors such as reliability and accuracy of the historical path. For example, if the historical path is a historical flight path of a companion drone, the historical path has a higher reference value and may be given a higher weight. If the historical path is a historical path of a mobile phone, a PDA or other device, the historical path may be given a lower weight.

II. Path interpolation: the interpolation is performed on the key points of the historical path and the key points of the second path to generate a new path. This method is applicable to the case where the historical path and the new path have some similar parts, and these similar parts may be smoothly merged. Specific steps include:

1. Analysis of historical path: firstly analyze the historical path and identify the curves and turning portions therein. This process may be completed by detecting the curvature and direction changes of the path. Portions with curvature greater than a threshold usually correspond to curves, while portions with large changes in direction may indicate turns.

2. Setting of key points: set key points at curves and turning positions. The key points may be located at the highest curvature points of the path, the turning points of the path, or other scene-specific locations. The key points will be used for subsequent interpolation.

3. Selection of interpolation algorithm: select an appropriate interpolation algorithm to generate a smooth curve between the set key points. Common interpolation methods include linear interpolation, spline interpolation, Bezier curve, etc. The selection of the interpolation algorithm specifically depends on the characteristics of the path and the smoothness requirement.

4. Interpolation: for each pair of key points, generate an interpolation path using the selected interpolation algorithm, thereby creating a new path that maintains smoothness between key points while trying to conform to the curves and turns of the historical path.

5. Integration of new path: integrate the new path generated by interpolation with other parts of the original path to form a complete planned path.

III. Path guidance: the historical path is regarded as the guidance path, and the new path may be adjusted according to the guidance path when generated. A path planning algorithm, such as A* algorithm, may be used to search based on the guidance path to obtain the new path.

In a possible implementation, the method further includes:

- estimating completion situation of a plurality of loading drones in performing the transport task according to current states of the plurality of loading drones; and
- determining a loading drone that takes shortest time to complete the transport task according to the completion situation.

In an embodiment of the present disclosure, the loading drone refers to a drone with carrying capability, and can carry and transport items or payloads. Such drone is usually equipped with a special payload platform, and allows a variety of payloads to be connected, to accomplish different types of tasks. For example, the drone may be equipped with clamps such as suction cups and claws, which can carry objects by adsorption or clamping. The drone may also be designed with a special cargo hold. For example, the cargo hold is arranged at the bottom of the drone; or in the dual-battery model, one battery compartment is used to arrange the cargo hold to thereby transport cargo. The drone may also be designed with mounting points at the bottom or other locations to mount various devices or items, such as a mounting compartment that can be raised and lowered with the help of cable.

The current states of the plurality of loading drones are obtained, including battery level, load condition, current location, and other information. Those drones that can take the shortest time to complete the task are screened out according to the estimated result for each drone. After screening, the loading drone that can complete the task fastest and ensure the success of the task is selected. After that, the transport task needs to be assigned to the selected drone, and the selected drone is notified to perform the task.

The solution of the embodiment of the present disclosure ensures that the most suitable one is selected from the plurality of loading drones to perform the task, and takes into account factors such as task completion time and electric power, to increase the overall transportation efficiency to the greatest extent.

In a possible implementation, S102 of planning the flight path for the transport task according to the construction location and the storage location includes:

- generating a pickup task according to a current location of the loading drone and the storage location; and
- planning the flight path for the transport task according to the storage location and the construction location when the pickup task is completed.

In an embodiment of the present disclosure, before controlling the drone to perform the transport task, since the drone and the storage location of the target workpiece are usually not in the same place, it is also necessary to generate a pickup task according to the current location of the loading drone and the storage location of the target workpiece.

After the drone reaches the target location, the drone performs the specific pickup operation. This may include using a tool such as robotic arm or suction cup for pickup, specifically depending on the nature of the target workpiece.

Once the pickup task is successfully executed, the drone will update the state and notify the system that the task is completed.

Figure 2:
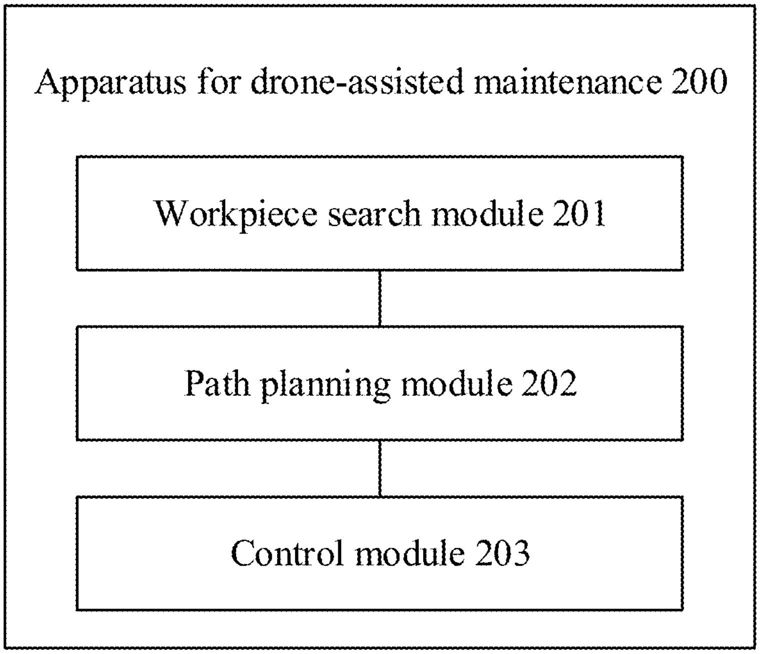
FIG. 2 is a schematic structural diagram of an apparatus for drone-assisted maintenance according to an embodiment of the present disclosure.

FIG. 2 is a schematic structural diagram of an apparatus for drone-assisted maintenance according to an embodiment of the present disclosure. As shown in FIG. 2, this apparatus includes:

- a workpiece search module 201 configured to determine a target workpiece and a storage location thereof in response to an assistance message obtained by a first terminal located at a construction location, where the assistance message is used to indicate the target workpiece absent in a maintenance operation;
- a path planning module 202 configured to plan a flight path for a transport task according to the construction location and the storage location; and
- a control module 203 configured to control a drone to transport the target workpiece to the construction location according to the flight path.

In a possible implementation, the workpiece search module 201 is configured to:

- determine workpiece information of a tool or part absent in the maintenance operation according to semantic information contained in the assistance message in response to the assistance message obtained by the first terminal located at the construction location; and determine the target workpiece and the storage location thereof from inventory according to the workpiece information.

In a possible implementation, the path planning module 202 includes:

an information determination submodule configured to determine environmental information for flight of the drone according to the construction location;

a type determining submodule configured to determine a task type according to the environmental information; and a planning submodule configured to plan the flight path for the transport task according to the task type, the construction location and the storage location.

In a possible implementation, the planning submodule is configured to:

when the task type is not a complex type, plan a plurality of first paths connecting the construction location with the storage location by using an open area and/or a passage area in a preset map;

evaluate time consumption and safety of the plurality of first paths; and select one from the plurality of first paths to obtain the flight path for the transport task according to an evaluation result and a timeliness requirement.

In a possible implementation, the planning submodule is configured to:

when the task type is a complex type, obtain a historical path of the first terminal;

plan and generate a second path according to the construction location and the storage location; and optimize and adjust the second path by using at least part of the historical path to obtain the flight path for the transport task.

In a possible implementation, the first terminal includes a companion drone, and the historical path of the first terminal includes a historical flight path of the companion drone.

In a possible implementation, the planning submodule is further configured to:

determine a complex area according to the construction location;

determine a first trajectory point entering the complex area from the second path;

determine a second trajectory point closest to the first trajectory point from the historical path;

merge a portion of the second path after the first trajectory point with a portion of the historical path after the second trajectory point to obtain a merged path; and splice a portion of the second path before the first trajectory point with the merged path to obtain the flight path for the transport task.

In a possible implementation, this apparatus further includes a selection module configured to:

estimate completion situation of a plurality of loading drones in performing the transport task according to current states of the plurality of loading drones; and determine a loading drone that takes shortest time to complete the transport task according to the completion situation.

In a possible implementation, the path planning module 202 is further configured to:

generate a pickup task according to a current location of the loading drone and the storage location; and plan the flight path for the transport task according to the storage location and the construction location when the pickup task is completed.

For the description of specific functions and examples of the modules and sub-modules of the apparatus of the embodiment of the present disclosure, reference may be made to the relevant description of the corresponding steps in the above-mentioned method embodiments, and details are not repeated here.

Figure 3:
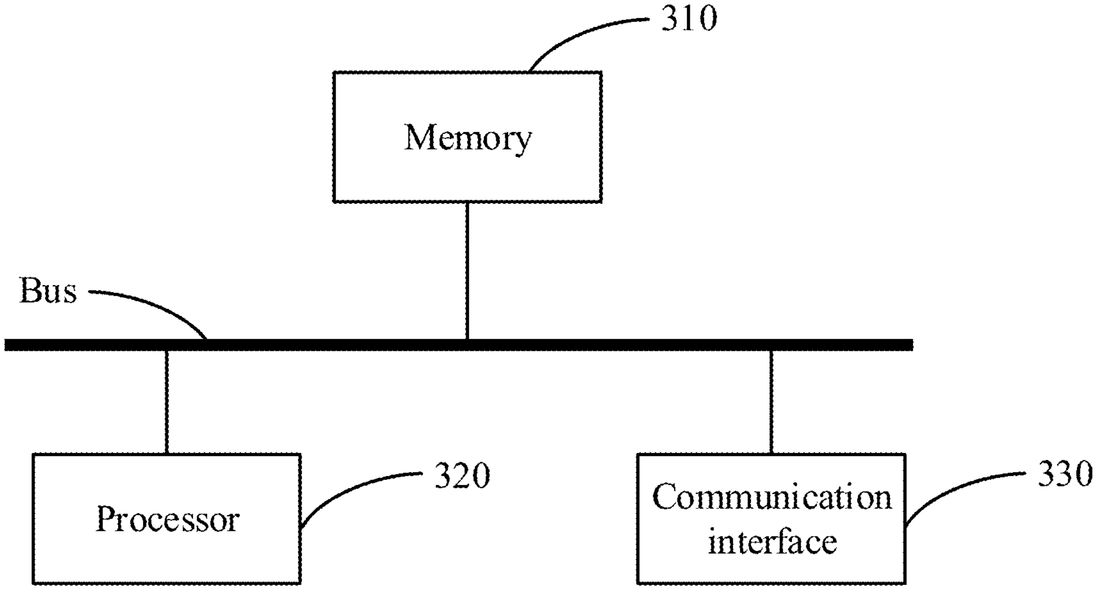
FIG. 3 is a block diagram of an electronic device for implementing the control method for drone-assisted maintenance according to an embodiment of the present disclosure.

FIG. 3 is a structural block diagram of an electronic device according to an embodiment of the present disclosure. As shown in FIG. 3, the electronic device includes: a memory 310 and a processor 320, and the memory 310 stores a computer program that can run on the processor 320. There may be one or more memories 310 and processors 320. The memory 310 may store one or more computer programs, and the one or more computer programs cause the electronic device to perform the method provided in the above method embodiment, when executed by the electronic device. The electronic device may also include: a communication interface 330 configured to communicate with an external device for data interactive transmission.

If the memory 310, the processor 320 and the communication interface 330 are implemented independently, the memory 310, the processor 320 and the communication interface 330 may be connected to each other and complete communication with each other through a bus. The bus may be an Industry Standard Architecture (ISA) bus, a Peripheral Component Interconnect (PCI) bus, or an Extended Industry Standard Architecture (EISA) bus, etc. The bus may be divided into address bus, data bus, control bus, etc. For ease of representation, the bus is represented by only one thick line in FIG. 3, but this thick line does not represent only one bus or only one type of bus.

Optionally, in a specific implementation, if the memory 310, the processor 320 and the communication interface 330 are integrated on one chip, the memory 310, the processor 320 and the communication interface 330 may communicate with each other through an internal interface.

It should be understood that the above-mentioned processor may be a Central Processing Unit (CPU) or other general-purpose processor, a Digital Signal Processor (DSP), an Application Specific Integrated Circuit (ASIC), a Field Programmable Gate Array (FPGA) or other programmable logic device, a discrete gate or transistor logic device, a discrete hardware component, etc. The general-purpose processor may be a microprocessor or any conventional processor, etc. It is worth noting that the processor may be a processor that supports the Advanced RISC Machines (ARM) architecture.

Further, optionally, the above-mentioned memory may include a read-only memory and a random access memory, and may also include a non-volatile random access memory. The memory may be a volatile memory or a non-volatile memory, or may include both a volatile memory and a non-volatile memory. Here, the non-volatile memory may include a Read-Only Memory (ROM), a Programmable ROM (PROM), an Erasable PROM (EPROM), an Electrically EPROM (EEPROM) or a flash memory. The volatile memory may include a Random Access Memory (RAM), which acts as an external cache. By way of illustration and not limitation, many forms of RAMs are available, for example, Static RAM (SRAM), Dynamic Random Access Memory (DRAM), Synchronous DRAM (SDRAM), Double Data Rate SDRAM (DDR SDRAM), Enhanced SDRAM (ESDRAM), Synchlink DRAM (SLDRAM) and Direct RAMBUS RAM (DR RAM).

The above embodiments may be implemented in whole or in part by software, hardware, firmware or any combination thereof. When implemented by software, they may be implemented in the form of a computer program product in whole or in part. The computer program product includes one or more computer instructions. When the computer instructions are loaded and executed on a computer, the processes or functions described in the embodiments of the present disclosure are generated in whole or in part. The computer may be a general-purpose computer, a special-purpose computer, a computer network, or other programmable device. The computer instructions may be stored in a computer readable storage medium or transmitted from a computer readable storage medium to another computer readable storage medium. For example, the computer instructions may be transmitted from a website, computer, server or data center to another website, computer, server or data center in a wired (e.g., coaxial cable, optical fiber, Digital Subscriber Line (DSL)) or wireless (e.g., infrared, Bluetooth, microwave, etc.) way. The computer readable storage medium may be any available medium that can be accessed by a computer, or a data storage device such as server or data center that is integrated with one or more available media. The available media may be magnetic media (for example, floppy disk, hard disk, magnetic tape), optical media (for example, Digital Versatile Disc (DVD)), or semiconductor media (for example, Solid State Disk (SSD)), etc. It is worth noting that the computer readable storage medium mentioned in the present disclosure may be a non-volatile storage medium, in other words, may be a non-transitory storage medium.

Those having ordinary skill in the art can understand that all or some of the steps for implementing the above embodiments may be completed by hardware, or may be completed by instructing related hardware through a program. The program may be stored in a computer readable storage medium. The above-mentioned storage medium may be a read-only memory, a magnetic disk or an optical disk, etc.

In the description of the embodiments of the present disclosure, the description with reference to the terms "one embodiment", "some embodiments", "example", "specific example" or "some examples", etc. means that specific features, structures, materials or characteristics described in conjunction with the embodiment or example are included in at least one embodiment or example of the present disclosure. Moreover, the specific features, structures, materials or characteristics described may be combined in a suitable manner in any one or more embodiments or examples. In addition, those skilled in the art can integrate and combine different embodiments or examples and features of different embodiments or examples described in this specification without conflicting with each other.

In the description of the embodiments of the present disclosure, "/" represents or, unless otherwise specified. For example, A/B may represent A or B. The term "and/or" herein only describes an association relation of associated objects, which indicates that there may be three kinds of relations, for example, A and/or B may indicate that only A exists, or both A and B exist, or only B exists.

In the description of the embodiments of the present disclosure, the terms "first" and "second" are only for purpose of description, and cannot be construed to indicate or imply the relative importance or implicitly point out the number of technical features indicated. Therefore, the feature defined with "first" or "second" may explicitly or implicitly include one or more features. In the description of the embodiments of the present disclosure, "multiple" means two or more, unless otherwise specified.

The above descriptions are only exemplary embodiments of the present disclosure and not intended to limit the present disclosure. Any modifications, equivalent replacements, improvements and others made within the spirit and principle of the present disclosure shall be contained in the protection scope of the present disclosure.

What is claimed is:

1. A control method for drone-assisted maintenance, comprising:

determining, by a data processing device, a target workpiece and a storage location thereof, in response to an assistance message obtained by a companion drone following maintenance personnel to a construction location located within a factory, by:

determining, by the data processing device, workpiece information of the target workpiece, according to semantic information contained in the assistance message; wherein the assistance message comprises a voice message spoken by the maintenance personnel and is used to indicate the target workpiece absent in a maintenance operation; and determining, by the data processing device, the storage location from inventory according to the workpiece information;

determining, by the data processing device, environmental information for flight of a drone according to the construction location, wherein the environmental information indicates complexity of an environment or difficulty of the flight of the drone;

in a case where it is determined, according to the environmental information, that the construction location is in an area with densely distributed devices, obtaining, by the data processing device, a historical path of the companion drone following the maintenance personnel to the construction location recorded by the companion drone;

planning and generating, by the data processing device, a second path according to the construction location and the storage location;

determining, by the data processing device, a complex area according to the construction location;

determining, by the data processing device, a first trajectory point from which the complex area is entered, from the second path;

determining, by the data processing device, a second trajectory point closest to the first trajectory point from the historical path;

merging, by the data processing device, a portion of the second path after the first trajectory point with a portion of the historical path after the second trajectory point, to obtain a merged path;

splicing, by the data processing device, a portion of the second path before the first trajectory point with the merged path, to obtain a flight path for a transport task; and controlling, by the data processing device, according to the flight path, the drone to transport the target workpiece to the construction location.

2. The method of claim 1, further comprising:

estimating completion situation of a plurality of loading drones in performing the transport task according to current states of the plurality of loading drones; and determining a loading drone that takes shortest time to complete the transport task according to the completion situation.

3. An electronic device, comprising:

at least one processor; and a memory connected in communication with the at least one processor;

wherein the memory stores an instruction executable by the at least one processor, and the instruction, when executed by the at least one processor, enables the at least one processor to execute:

determining a target workpiece and a storage location thereof, in response to an assistance message obtained by a companion drone following maintenance personnel to a construction location located within a factory, by:

determining workpiece information of the target workpiece, according to semantic information contained in the assistance message; wherein the assistance message comprises a voice message spoken by the maintenance personnel and is used to indicate the target workpiece absent in a maintenance operation; and determining the storage location from inventory according to the workpiece information;

determining environmental information for flight of a drone according to the construction location, wherein the environmental information indicates complexity of an environment or difficulty of the flight of the drone;

in a case where it is determined, according to the environmental information, that the construction location is in an area with densely distributed devices, obtaining a historical path of the companion drone following the maintenance personnel to the construction location recorded by the companion drone;

planning and generating a second path according to the construction location and the storage location;

determining a complex area according to the construction location;

determining a first trajectory point from which the complex area is entered, from the second path;

determining a second trajectory point closest to the first trajectory point from the historical path;

merging a portion of the second path after the first trajectory point with a portion of the historical path after the second trajectory point, to obtain a merged path;

splicing a portion of the second path before the first trajectory point with the merged path, to obtain a flight path for a transport task; and controlling, according to the flight path, the drone to transport the target workpiece to the construction location.

4. A non-transitory computer-readable storage medium storing a computer instruction thereon, wherein the computer instruction is used to cause a computer to execute:

determining a target workpiece and a storage location thereof, in response to an assistance message obtained by a companion drone following maintenance personnel to a construction location located within a factory, by:

determining workpiece information of the target workpiece, according to semantic information contained in the assistance message; wherein the assistance message comprises a voice message spoken by the maintenance personnel and is used to indicate the target workpiece absent in a maintenance operation; and determining the storage location from inventory according to the workpiece information;

determining environmental information for flight of a drone according to the construction location, wherein the environmental information indicates complexity of an environment or difficulty of the flight of the drone;

in a case where it is determined, according to the environmental information, that the construction location is in an area with densely distributed devices, obtaining a historical path of the companion drone following the maintenance personnel to the construction location recorded by the companion drone;

planning and generating a second path according to the construction location and the storage location;

determining a complex area according to the construction location;

determining a first trajectory point from which the complex area is entered, from the second path;

determining a second trajectory point closest to the first trajectory point from the historical path;

merging a portion of the second path after the first trajectory point with a portion of the historical path after the second trajectory point, to obtain a merged path;

splicing a portion of the second path before the first trajectory point with the merged path, to obtain a flight path for a transport task; and controlling, according to the flight path, the drone to transport the target workpiece to the construction location.

5. The electronic device of claim 3, wherein the instruction, when executed by the at least one processor, enables the at least one processor to further execute:

estimating completion situation of a plurality of loading drones in performing the transport task according to current states of the plurality of loading drones; and determining a loading drone that takes shortest time to complete the transport task according to the completion situation.

6. The non-transitory computer-readable storage medium of claim 4, wherein the computer instruction is used to cause the computer to further execute:

estimating completion situation of a plurality of loading drones in performing the transport task according to current states of the plurality of loading drones; and determining a loading drone that takes shortest time to complete the transport task according to the completion situation.

* * * * *